March 29, 1949.  H. G. WARNKE  2,465,560

LEAKPROOF CYLINDER

Filed Dec. 24, 1943

INVENTOR.
HANS G. WARNKE
BY
His Attorney

Patented Mar. 29, 1949

2,465,560

UNITED STATES PATENT OFFICE 2,465,560

LEAKPROOF CYLINDER

Hans G. Warnke, Detroit, Mich.

Application December 24, 1943, Serial No. 515,611

1 Claim. (Cl. 137—156)

My invention relates to a new and useful improvement in a leak-proof cylinder adapted for use as a pneumatic, hydraulic, or any fluid operated cylinder. In the use of any fluid operated cylinder, considerable leakage is encountered. This is due to many factors; for instance, at each stroke of the piston a certain amount of leakage coming from the pressure fluid is carried forward and when the piston returns, it is left in its position. In the course of time, depending upon the amount of strokes and the amount of leakage between piston and cylinder, considerable fluid passes to the other side of the piston. If the oil or fluid is under high pressure, the fluid will heat up and, since the viscosity of the fluid is diminished to a certain degree, will result in a still greater leakage. This difficulty is particularly encountered in welding machines where hydraulically operated gun cylinders operate in rapid succession and sometimes under an oil pressure of over one thousand pounds per square inch.

This leakage is undesirable also from the standpoint of efficiency: If the leakage is able to pass out of the mechanism which is operated, such leakage may slow up fabrication and result in an imperfect product; particularly is this so in airplane assembly work where even the slightest trace of oil or other liquid between two rigid joints causes an unsatisfactory condition.

It is an object of the present invention to provide a cylinder having a piston operating therein and so constructed and arranged that leakage is entirely prevented and the difficulties and disadvantages enumerated avoided.

It is another object of the present invention to provide an expansible container which is positioned in the cylinder and into which the fluid under pressure is delivered so that the container delivers the thrust to the piston and, being impervious to the driving fluid used, eliminates all leakage.

Other objects will appear hereinafter.

It is recognized that various modifications and changes may be made in the detail of structure illustrated without departing from the invention itself and it is intended that such variations and changes shall be encompassed within the scope of the claim which forms a part hereof.

Forming a part of this specification are drawings in which

Figure 1:
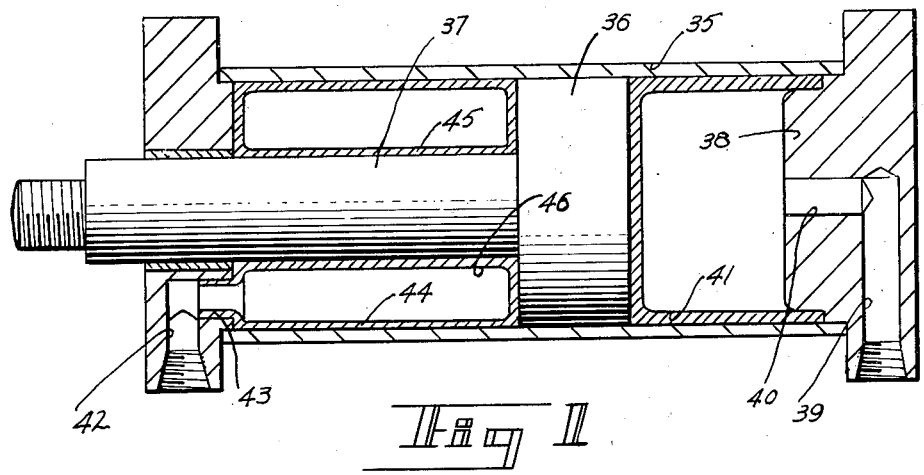
Fig. 1 is a longitudinal, central, vertical, sectional view of the invention.

In the drawings I have shown a structure in which the piston is operated upon from both sides. In this view, the cylinder 35 is provided with a slidably mounted piston 36 having the piston rod 37. The closure 38 at one end of the cylinder 35 is provided with the inlet passages 39 and 40 which communicate with the cup-shaped sack 41, formed from elastic, expansible material. On the opposite side of the cylinder, the end wall 50 is provided with the passages 42 and 43 which communicate with the space 46 formed in the elastic or expansible container 44, provided with the intermediate wall 45. In this type of cylinder, the sack is, of course, compressible as well as expansible.

Figure 2:
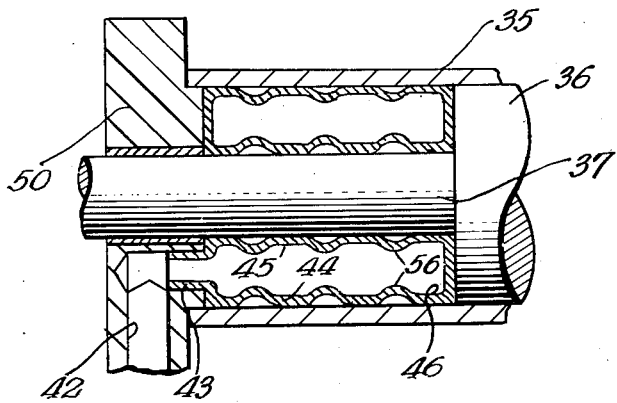
Fig. 2 is a view similar to Fig. 1 showing a different position.

When fluid is delivered under pressure through the passages 39 and 40, the sack 41 would expand and the piston 36 would move to the left as shown in Fig. 2 allowing the walls 44 and 45 of the sack to assume their normal position, which is shown in Fig. 2, so that the corrugations 56 would resume their normal form. By using the corrugations, the expansion of the sack may take place without unduly stretching the body of the material itself, and thus a long movement may be provided in the sack, and at the same time an undue wrinkling of the walls 44 and 45 is prevented when pressure is delivered into the sack 41 to force the piston 36 to the left.

In this type of structure the fluid is delivered into an impervious expansible container so that leakage from the cylinder is prevented. The structure illustrated is one which is simple of manufacture and which has proven highly efficient in use.

What I claim as new is:

A construction of the class described comprising: a cylinder; a piston slidably mounted in said cylinder, said cylinder having an inlet passage for reception of fluid under pressure; a sack positioned in said cylinder and stationary relatively thereto at one end for reception of fluid from said inlet passage and expansible in response to pressure of said fluid for delivering a thrust against said piston, said sack comprising a pair of concentrically arranged spaced apart walls corrugated intermediate their ends, there being a passage extending axially of said inner wall through said sack; and a piston rod on said piston extending through said passage.

HANS G. WARNKE.

REFERENCES CITED

The following references are of record in the file of this patent:

UNITED STATES PATENTS

| Number | Name | Date |
|---|---|---|
| 1,085,818 | Oxnard | Feb. 3, 1914 |
| 1,149,114 | Carlock | Aug. 3, 1915 |
| 1,377,981 | Holdsworth | May 10, 1921 |
| 1,515,702 | Reybold | Nov. 18, 1924 |
| 1,744,241 | Pierle | Jan. 21, 1930 |
| 1,924,888 | Tatter | Aug. 29, 1933 |
| 1,928,368 | Coffey | Sept. 26, 1933 |
| 1,993,961 | Graven et al. | Mar. 12, 1935 |
| 2,178,490 | Nielsen | Oct. 31, 1939 |
| 2,200,305 | Sauzedde | May 14, 1940 |

FOREIGN PATENTS

| Number | Country | Date |
|---|---|---|
| 465,539 | France | Feb. 9, 1914 |
| 578,476 | France | July 13, 1924 |
| 763,351 | France | Feb. 12, 1934 |
| 763,558 | France | Feb. 12, 1934 |